United States Patent [19]

Shook

[11] 4,009,810

[45] Mar. 1, 1977

[54] WATER BOTTLE CAGE

[75] Inventor: William Blair Shook, Rochester, N.Y.

[73] Assignee: Thurston, Inc., Columbus, Ohio

[22] Filed: Dec. 12, 1975

[21] Appl. No.: 640,018

[52] U.S. Cl. .............................. 224/39; 224/32 R; 248/311.1

[51] Int. Cl.² .......................................... B62J 11/00

[58] Field of Search ............. 224/5 W, 39 R, 30 R, 224/32 R, 42.45 R, 42.46 R, 37, 34, 35, 36; 248/229, 313, 311.1

[56] References Cited

UNITED STATES PATENTS

| | | | |
|---|---|---|---|
| 597,318 | 1/1898 | Jenks | 224/39 R |
| 1,377,350 | 5/1921 | Hoskin | 248/313 X |
| 1,419,488 | 6/1922 | Call | 248/311.1 |
| 2,337,114 | 12/1943 | Krakauer | 248/313 |
| 3,840,153 | 10/1974 | Devlin | 224/32 R X |
| 3,884,439 | 5/1975 | Jeninga | 248/311.1 X |

FOREIGN PATENTS OR APPLICATIONS

| | | | |
|---|---|---|---|
| 434,799 | 5/1948 | Italy | 224/32 R |

*Primary Examiner*—Robert J. Spar
*Assistant Examiner*—Jerold M. Forsberg

[57] ABSTRACT

A cage for receiving and holding a water bottle which can be readily attached to a bicycle frame or the like. It consists of a single piece of resilient wire bent to form the cage with a solderless, weldfree connection for the joint at the adjacent ends of the wire. This connection, along with a special mounting means, also provides a less abrasive protective surface for frictionally engaging and gripping the bottle.

2 Claims, 5 Drawing Figures

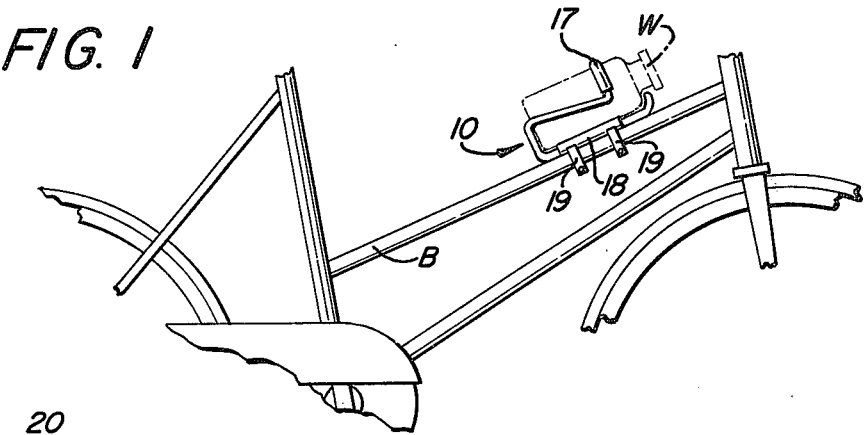
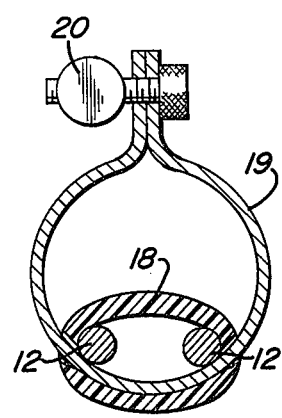
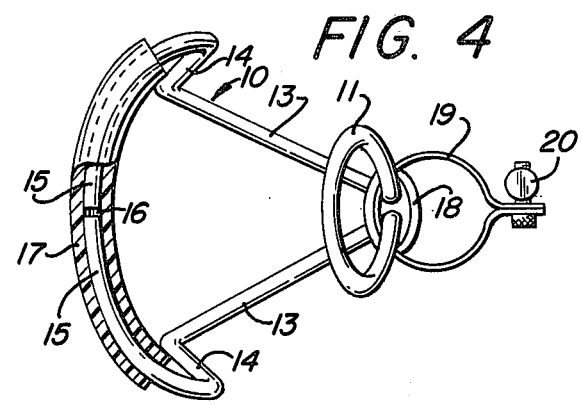
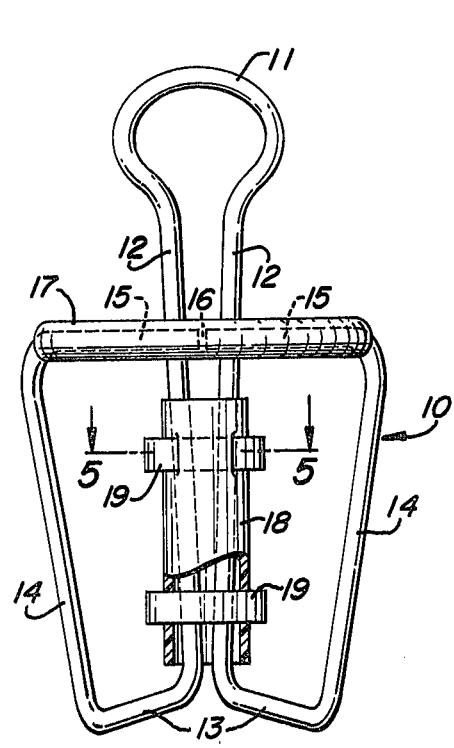
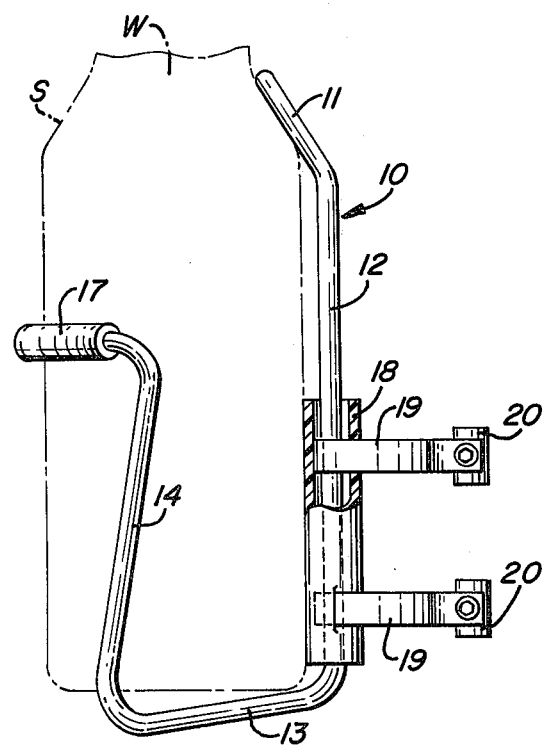

WATER BOTTLE CAGE

BACKGROUND AND PURPOSE OF THE INVENTION

This invention deals with the provision of a wire cage to be attached to the frame of a bicycle or the like for removably receiving and retaining a water bottle so it can be easily inserted therein or received for use. Prior art cages of this general type have been made from a single piece of wire but it has been necessary to solder or weld the joint formed at the ends of the wire. Also, the wire scratches and damages the bottle, which is usually plastic, during its repeated insertion into and removal from the cage.

The present invention provides a cage formed from a single piece of wire, with its ends joined by a plastic tube which provides a less abrasive surface for engaging and gripping the plastic bottle at one side along with another plastic tube which forms part of the cage mounting means and engages and grips the bottle at its opposite side.

BRIEF DESCRIPTION OF THE DRAWINGS

The best mode contemplated in carrying out this invention is illustrated in the accompanying drawing in which:

FIG. 1 is a schematic side elevational view illustrating the water bottle cage mounted on a bicycle frame.

FIG. 2 is a side elevational view partly broken away, of the water bottle cage.

FIG. 3 is a front elevational view, partly broken away, of the water bottle cage.

FIG. 4 is a plan view, partly broken away, of the water bottle cage.

FIG. 5 is an enlarged horizontal sectional view taken along line 5 — 5 of FIG. 3.

DETAILED DESCRIPTION OF THE INVENTION

With reference to the drawing, as an example of the use of the water bottle cage, of this invention, it is shown in FIG. 1 mounted on a bar B of a bicycle frame. The cage of this invention is indicated generally by the numeral 10 and receives and retains removably the water bottle W which is usually of plastic. The other Figures show the specific structure of the cage.

The cage is formed from a single piece of resilient wire bent as indicated to provide a socket for receiving the bottle W. The single piece of wire is bent to provide an inverted U back portion which has an upper retainer or catch 11 of loop or eye form which is angled forwardly. Extending downwardly from the catch 11 are the legs 12 which converge towards each other into almost contacting relationship and have forwardly-extending and slightly downwardly inclined arms 13 which diverge laterally. Extending upwardly and inclined rearwardly slightly from the arms 13 is an inverted U-formed portion of lower height than the back portion and consisting of the upstanding legs 14. These legs join with the inwardly extending ends 15 which extend horizontally and almost meet at a joint 16. The arms 15 bow outwardly and forwardly in an outwardly curving arc. Thus, the one piece of wire is bent to form the socket for the water bottle with the horizontally disposed ends meeting at the joint 16. To connect these ends without solder or welding, a plastic tube section 17 is used. This section is forced over the adjacent ends 15, fitting tightly thereon to firmly connect the adjacent ends and bridging the joint 16. It is preferably made of non-abrasive material such as plastic but may be of other nonmetallic material such as rubber.

The lower ends of the converging legs 12 also have mounted thereon a non-abrasive plastic tube or sleeve 18 which prevents spreading thereof. This extends vertically from just above the arms 13 to just below the horizontal ends 15. To provide mounting means for the cage, metal straps 19 are threaded through openings in the tube 18 at different levels, passing ahead of the legs 12. These straps may be passed around the bar B and be clamped in position by barrel nut and bolt units 20 carried thereby.

When the bottle W is inserted in the cage 10, it is angled rearwardly or inwardly so that its lower portion will pass between the tube 17, which will act as a bumper or guide and the catch 11. The leading corner will then engage the upstanding tube 18 and the bottle will be guided to its final position in the socket by the non-abrasive surfaces of the bumper tubes 17 and 18. When the bottle bottom engages the lower arms 13 (FIG. 2) the catch 11 will be in engagement with the sloping surface S at the bottle neck and will serve to retain the bottle in place, this retention being further aided by frictional engagement of members 17 and 18 with the opposite sides of the bottle.

It will be apparent from the above, that this invention provides a simple inexpensive water bottle cage to receive the bottle and clamp it firmly but to permit ready removal therefrom when desired. The cage is made from a single piece of resilient wire with its ends joined together without solder or welding. The connecting tube for the ends is made of soft non-metallic material which will engage and guide the bottle during insertion and removal. The other tube of soft non-metallic material functions similarly and is used for connecting the mounting means to the cage and to prevent spreading of the upstanding rear legs thereof.

Having thus described the invention, what is claimed is:

1. A cage for a water bottle or the like comprising a single piece of resilient wire bent to form a bottle-receiving and retaining socket consisting of the following: an upstanding rear retaining portion of inverted U-form which has an upper catch portion of eye-form angled forwardly of a pair of legs which converge toward each other in a common plane to lower portions almost in contacting relationship which have forwardly-extending and slightly downwardly-inclined arms which diverge laterally; an inverted U-form forward retaining portion extending upwardly from said inclined arms in forwardly-spaced relationship to the rear retaining portion and inclined rearwardly toward said portion being of lower height than the rear retaining portion and provided with a pair of upstanding rearwardly-inclined legs having the respective ends of the wire bent inwardly into a common horizontal plane at a lower level than said catch portion to substantially meet at a joint, said inwardly bent wire ends bowing forwardly in a forwardly-converging arc; a non-abrasive non-metallic tube section positioned on the arms to connect the wire ends and to bridge the joint therebetween as well as to provide a bumper for engaging the front side of the bottle as it is inserted into the socket; a non-abrasive non-metallic sleeve mounted on said lower converging portions of the rear retainer portion which prevents spreading thereof and also provides a bumper for engaging the rear side of the bottle as it is inserted into the socket.

2. A cage according to claim 1 in which attaching straps are provided extending through said sleeve at different levels for fastening the cage to a suitable support.

* * * * *